(12) United States Patent
Mercea et al.

(10) Patent No.: US 9,696,819 B2
(45) Date of Patent: Jul. 4, 2017

(54) METHOD AND APPARATUS PERTAINING TO A STYLUS HAVING A MULTI-LEVEL FORCE-SENSITIVE USER INTERFACE

(71) Applicant: BlackBerry Limited, Waterloo (CA)

(72) Inventors: Cornel Mercea, Waterloo (CA); Jacek S. Idzik, Kenilworth (CA); Ralph Allan Stacey, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 30 days.

(21) Appl. No.: 13/929,881

(22) Filed: Jun. 28, 2013

(65) Prior Publication Data

US 2015/0002481 A1    Jan. 1, 2015

(51) Int. Cl.
 *G06F 3/0354* (2013.01)
 *G06F 3/038* (2013.01)

(52) U.S. Cl.
 CPC ........ *G06F 3/03545* (2013.01); *G06F 3/0383* (2013.01); *G06F 2203/0384* (2013.01)

(58) Field of Classification Search
 None
 See application file for complete search history.

(56) References Cited

U.S. PATENT DOCUMENTS

| | | | |
|---|---|---|---|
| 2001/0006383 A1 | 7/2001 | Fleck et al. | |
| 2005/0110774 A1 | 5/2005 | Zuta et al. | |
| 2009/0264713 A1 | 10/2009 | Van Loenen et al. | |
| 2012/0068964 A1 | 3/2012 | Wright et al. | |
| 2012/0331546 A1* | 12/2012 | Falkenburg | G06F 3/03545 726/16 |
| 2013/0207937 A1* | 8/2013 | Lutian | G06F 3/042 345/175 |
| 2013/0249823 A1* | 9/2013 | Ahn | G06F 3/038 345/173 |

FOREIGN PATENT DOCUMENTS

EP    2273346 A1    1/2011

OTHER PUBLICATIONS

Extended European Search Report from related European Patent Application No. 13174426.0 dated Nov. 14, 2013; 10 pages.

* cited by examiner

*Primary Examiner* — Seokyun Moon
*Assistant Examiner* — Douglas Wilson
(74) *Attorney, Agent, or Firm* — Thomas Grzesik; Fleit Gibbons Gutman Bongini & Bianco P.L.

(57) ABSTRACT

A stylus comprises a barrel having a scribing nib disposed at one end thereof. The barrel supports at least one multi-level force-sensitive user interface. A control circuit operably couples to this control surface and responds differently to each of at least two different levels of applied force as applied to that control surface. For example, the control circuit can respond to one level of applied force by causing the transmission of a first signal to influence in a first way the scribing interaction between the stylus and the scribing surface and can respond to a second, different level of applied force by causing the transmission of a second, different signal to influence in a second, different way the scribing interaction between the stylus and the scribing surface.

9 Claims, 3 Drawing Sheets

METHOD AND APPARATUS PERTAINING TO A STYLUS HAVING A MULTI-LEVEL FORCE-SENSITIVE USER INTERFACE

FIELD OF TECHNOLOGY

The present disclosure relates to styli employed as a user interface to a corresponding electronic device.

BACKGROUND

Various styli are known and typically serve in conjunction with a scribing surface that is configured to work with a corresponding stylus. (As used herein, the word "scribing" will be understood to refer to the temporary physical placement of a writing instrument on a writing surface whether for the purpose of writing on the writing surface or for otherwise inputting information, instructions, and/or selections.) Generally speaking, a stylus is typically a hand-held writing utensil that often (but not exclusively) has a pencil-like elongated form factor and that includes at least one pointed end configured to interact with the scribing surface. Using a stylus as an input mechanism with, for example, a display offers a variety of advantages over a fingertip including the opportunity for increased precision as well as an expression modality that accords with the user's own past experience with a pencil or pen.

Some styli include an integral force sensor that senses the force being applied to the scribing tip. So configured, the stylus can detect the force that the user employs from moment to moment when bearing the stylus tip down on a scribing surface. This information can be used by a corresponding host electronic device in a variety of ways. As one simple example, the amount of force being applied to the scribing surface via stylus input can serve to control the relative thickness of a corresponding line of so-called electronic ink being rendered on a display.

Some styli also include one or more user interfaces such as one or more buttons. Such buttons typically comprise simple "on" and "off" mechanisms by which a user can provide, for example, a so-called right click or left click signal to a corresponding receiver.

While the foregoing components, alone or in various combinations with one another, enable a variety of useful functionality, existing styli do not suit all user's needs in all application settings.

DETAILED DESCRIPTION

Figure 1:
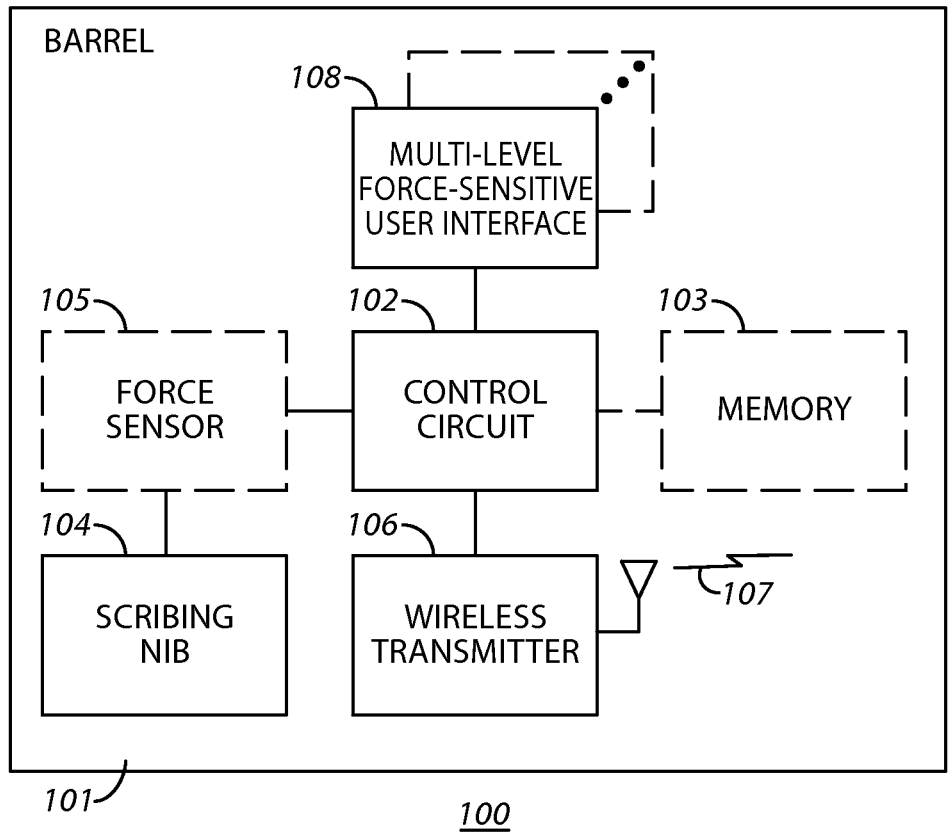
FIG. 1 is a block diagram in accordance with the disclosure.

The following describes an apparatus and method pertaining to a stylus that is configured for use with a scribing surface. By one approach the stylus comprises a barrel having a scribing nib disposed at one end thereof. The barrel supports at least one multi-level force-sensitive user interface. A control circuit that operably couples to this control surface can be configured to respond differently to each of at least two different levels of applied force as applied to that control surface.

So configured, for example, the control circuit can respond to one level of applied force by causing the transmission of a first signal to influence in a first way the scribing interaction between the stylus and the scribing surface and can respond to a second, different level of applied force by causing the transmission of a second, different signal to influence in a second, different way the scribing interaction between the stylus and the scribing surface. A user can manipulate the multi-level force-sensitive user interface (by applying different levels of force thereto) to thereby influence how, for example, the stylus applies electronic ink to the scribing surface.

These teachings are highly flexible in practice and will accommodate, for example, a variety of modifications and combinations. As one example, these teachings will readily serve in combination with a stylus having a multi-level force-sensitive scribing nib. In such a case and by one approach the aforementioned control circuit can be configured to temporarily freeze responding to changes in applied force as applied to the multi-level force-sensitive scribing nib while responding to changing levels of applied force to the aforementioned multi-level force-sensitive user interface.

So configured, a user can employ a stylus to enter/apply electronic ink to a corresponding scribing surface (such as a stylus-sensing/tracking display) while accommodating and facilitating, for example, dynamic variations to the electronic ink as regards such things as line width, color, texture, pattern, transparency, hue, chroma, and various other stylistic formats and renderings as may be desired. Many users can successfully and creatively employ such a capability with little or no training.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

Figure 2:
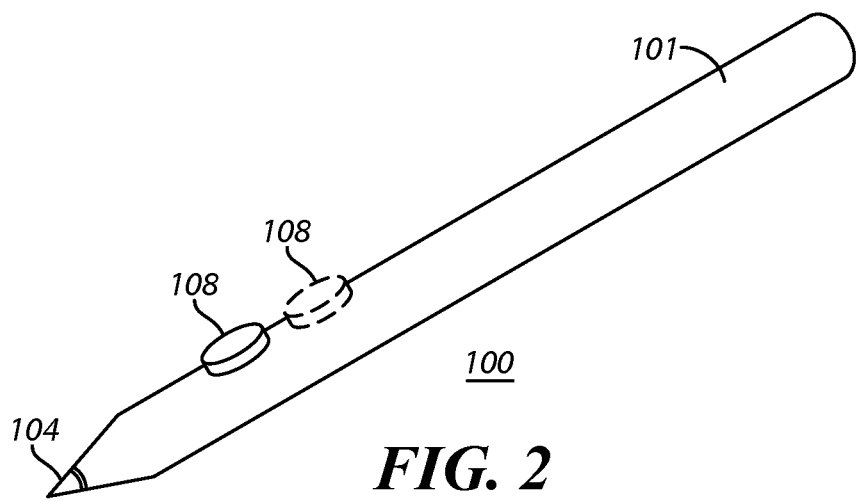
FIG. 2 is a perspective view in accordance with the disclosure.

FIGS. 1 and 2 present an example of a stylus 100 that accords at least in part with at least some of these teachings. This stylus 100 includes a barrel 101 that is shaped and sized to be readily grasped and manipulated by at least the average-sized person. This barrel 101 supports (in at least some cases by at least partially containing) a variety of stylus components.

In this illustrative example the stylus components include a control circuit 102. Such a control circuit 102 can comprise a fixed-purpose hard-wired platform or can comprise a partially or wholly programmable platform. These architectural options are well known and understood in the art and require no further description here. This control circuit 102 is configured (for example, by using corresponding programming as will be well understood by those skilled in the art) to carry out one or more of the steps, actions, and/or functions described herein.

By when approach (when, for example, the control circuit 102 comprises a wholly or partially-programmable component) the control circuit 102 can optionally operably couple to a memory 103. The memory 103 may be integral to the control circuit 102 or can be physically discrete (in whole or in part) from the control circuit 102 as desired. This memory 103 can serve, for example, to non-transitorily store the computer instructions that, when executed by the control circuit 102, cause the control circuit 102 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

This stylus 100 has a scribing nib 104 disposed at one end of the barrel 101. (These teachings will readily accommodate having a scribing nib at both ends of the barrel. For the sake of simplicity, however, this description presumes only one scribing nib.) Scribing nibs are well known in the art and include a variety of passive and active assemblies. Generally speaking, the scribing nib physically interacts with a scribing surface. By tracking the location and movement of the scribing nib with respect to the scribing surface, the user can enter a line of rendered electronic ink on a corresponding display. (The display is often one with the scribing surface but other paradigms are known in the art in these regards.)

By one optional approach the stylus 100 can further include a force sensor 105 that operably couples to the scribing nib 104 and that serves to detect force being applied to the scribing nib 104 (for example, when applying the scribing nib 104 against the scribing surface during use). Such a force sensor 105 can comprise, if desired, a multi-level force-sensitive sensor 105. So configured, the scribing nib 104 comprises a multi-level force-sensitive scribing nib.

In this case, and at least within some corresponding operating range, the force sensor 105 senses the amount of force being applied by the user when scribing with the stylus 100. This sensed force can serve, in turn, to characterize in some predetermined manner the scribing data provided by the stylus 100 to the scribing surface. As one simple example, the force applied by the user when scribing with the stylus 100 can cause the thickness of the corresponding line of rendered electronic ink to vary in a corresponding manner.

Scribing nibs and force sensors as employed with scribing nibs comprise a well-understood area of prior art endeavor. Therefore, for the sake of brevity further details in these regards are not presented here.

The stylus 100 also includes a wireless transmitter 106 that operably couples to the control circuit 102. This wireless transmitter 106 can serve, for example, to transmit wireless signals 107 representing data developed by the stylus 100 during scribing use. This data can include, for example, nib-force data, stylus-tilt data, and other data as described herein as may be desired. For many application settings it will serve for the wireless transmitter 106 to utilize a radio-frequency carrier. Various short-range methodologies, such as Bluetooth™, are well known in the art and will serve well in these regards. These teachings will accommodate other approaches in these regards, however, including but not limited to the use of optical carriers (including infrared light carriers), ultrasonic carriers, and so forth.

These teachings also provide for one or more multi-level force-sensitive user interfaces 108. As illustrated in FIG. 2, by one approach such a multi-level force-sensitive user interface can comprise a push button if desired. These teachings will readily accommodate numerous other possibilities in these regards as well as desired.

As used herein, the expression multi-level force-sensitive user interface will be understood to refer to a control surface that can discretely detect at least two different amounts of applied force (in addition to and beyond detecting the absence of any applied force). Accordingly, the control surface can discretely and separately detect and distinguish between at least a first amount of force by which the user presses such a button and a second, greater amount of force by which the user presses such a button.

The number of discrete levels (including both discrete values as well as ranges of discrete values) of applied force that a given control surface will accommodate can vary as desired with the needs and/or opportunities provided by a given application setting. For many application settings, for example, it may suffice to differentiate only between applied forces that are less than a given threshold amount of applied force and applied forces that are greater than that given threshold amount of applied force. In other cases it can be useful to distinguish between, say, three discrete ranges of applied force, five discrete ranges of applied force, and so on.

Such a multi-level force-sensitive user interface 108 can be realized via any of a variety of technologies and/or mechanisms/assemblies. By one approach, for example, such a multi-level force-sensitive user interface 108 can comprise a button that is biased away from the barrel 101 and which bears against a piezoelectric component when asserted. The piezoelectric component, in turn, provides an electrical output that varies with the amount of force being applied thereto via the button.

Such a multi-level force-sensitive user interface 108 can be located where desired on the barrel 101. In many cases it will serve well if the multi-level force-sensitive user interface 108 is located where a user's finger can readily engage the multi-level force-sensitive user interface 108 even when otherwise holding and scribing with the stylus 100 in ordinary course of usage.

Figure 3:
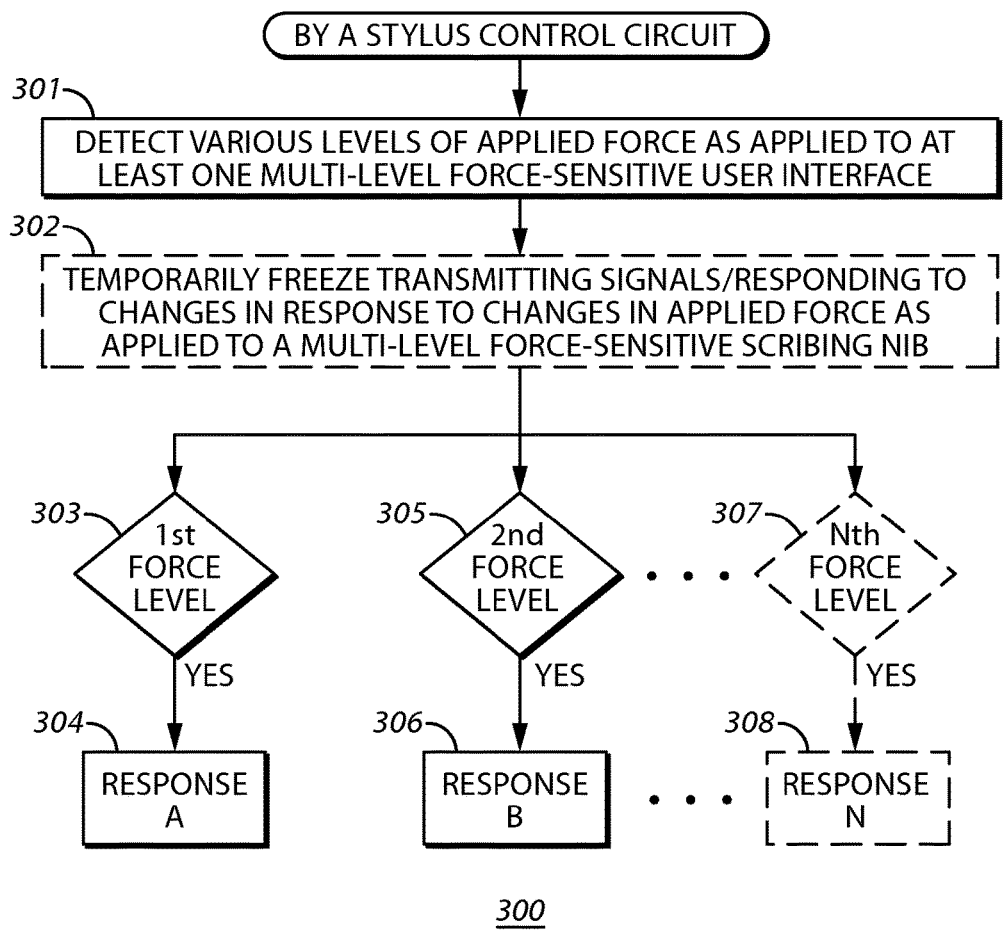
FIG. 3 is a flow diagram in accordance with the disclosure.

Such a stylus 100 can serve in a variety of ways. FIG. 3 presents a few illustrative examples in these regards. It will be understood that no particular limitations are intended by way of the specificity of these examples.

Figure 4:
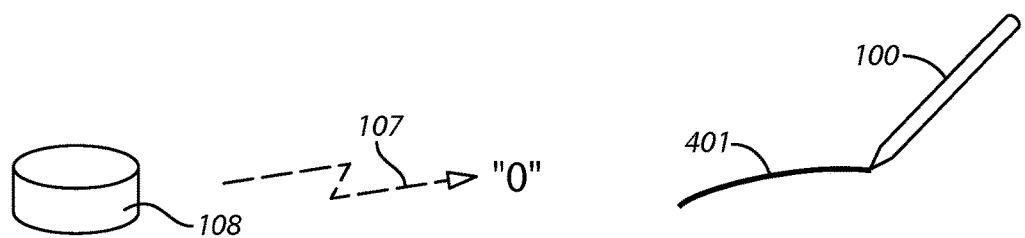
FIG. 4 is an action-composite diagram in accordance with the disclosure.

Per this process 300 the aforementioned control circuit 102 detects, at block 301, various levels of applied force as applied to at least one multi-level force-sensitive user-asserted control surface 108 as described above. As shown in FIG. 4, when there is no applied force being applied to the multi-level force-sensitive user-asserted control surface 108 the control circuit 102 will not respond differently to or otherwise modify or influence, for example, a line 401 of electronic ink being then rendered in response to scribing use of the stylus 100.

By one approach the aforementioned wireless transmitter 106 may not transmit any date, information, or signal that specifically represents such a lack of an applied force to the multi-level force-sensitive user-asserted control surface 108. By an optional approach, however, and if desired, the control circuit 102 employs the wireless transmitter 106 to transmit a signal (represented in FIG. 4 by the number "0") to specifically represent and signify the lack of applied force to the multi-level force-sensitive user-asserted control surface 108.

As noted above, if desired the stylus 100 can include a multi-level force-sensitive scribing nib 104. In such a case, this process 300 can provide, at optional block 302 for temporarily freezing transmitting any signals or otherwise responding to changes as regards force being currently applied to that multi-level force-sensitive scribing nib 104. By another approach, the control circuit 102 can multiplex monitoring and/or transmitting data regarding changes in applied force to both the multi-level force-sensitive scribing nib 104 and the multi-level force-sensitive user-asserted control surface 108. Choices in these regards can depend, for example, upon processing capabilities of the control circuit 102, available transmission bandwidth and/or payload capacity of the wireless transmitter 106, user preferences, and so forth as desired.

As is further illustrated in FIG. 3, per this process 300 the control circuit 102 responds differently to each of at least two different levels of applied force as is applied to the multi-level force-sensitive user-asserted control surface 108. (More than two different levels of applied force, each having a corresponding different response, are represented in FIG. 3 by blocks 307 and 308 where "N" represents an integer greater than "2.")

Figure 5:
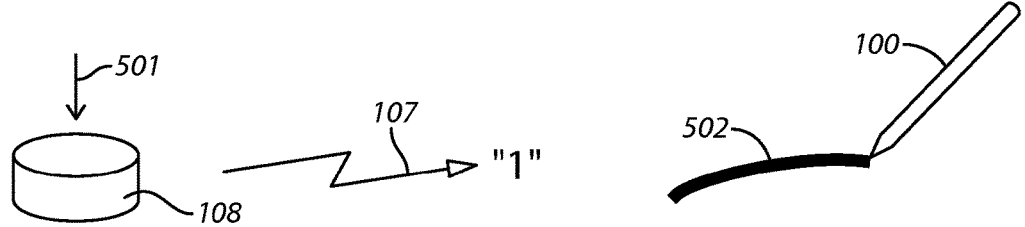
FIG. 5 is an action-composite diagram in accordance with the disclosure.

For example, upon detecting a first force level at block 303 (which first force level may comprise a discrete amount of force or can, if desired, comprise a range of contiguous discrete force values) the control circuit 102 can respond using response "A" (as denoted at block 304). As a simple illustrative example, and referring to FIG. 5, upon detecting a first force level (denoted by reference numeral 501) the control circuit 102 can cause the corresponding transmission of a corresponding signal (represented here by the value "1"). The receiving scribing surface can use that signal to then influence in a corresponding way a currently-rendered line 502 of electronic ink. In particular, per this illustrative example, the line 502 of electronic ink increases in thickness as a direct response to the control circuit 102 detecting the first force level 501 via the multi-level force-sensitive user-asserted control surface 108.

Figure 6:
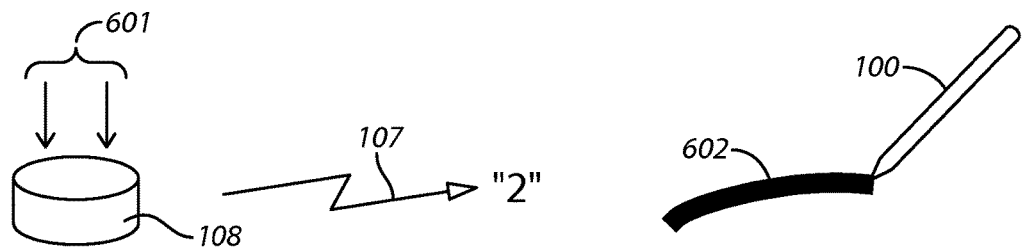
FIG. 6 is an action-composite diagram in accordance with the disclosure.

Upon detecting a second force level at block 305, the control circuit 102 responds at block 306 using response "B." As a further illustrative example and referring to FIG. 6, upon detecting this second force level (represented by reference numeral 601) the control circuit 102 now responds by causing the transmission of a different corresponding signal (in this case the number "2") that the receiving scribing surface employs to further thicken the rendered line 602 of electronic ink.

So configured, one or more simple finger-based buttons, sliders, faders, scroll wheels, trackballs, or other multi-level control surfaces readily facilitate the user exerting greater intuitive control over the rendering of a scribed line of electronic ink. By one approach these teachings can serve as a substitute for a force-sensitive scribing nib. Dispensing with a force-sensitive scribing nib, in turn, can help the user avoid applying undue force to the scribing surface itself in a possibly harmful manner.

By another approach, these teachings are readily employed in conjunction with a force-sensitive scribing nib. In such a case, forces applied to one user-interface modality can serve to modify changes made in response to forces applied to the other user-interface modality. As one simple example in these regards, force applied to a force-sensitive scribing nib can serve to vary the thickness of a corresponding scribed line of electronic ink while force applied via a multi-level force-sensitive user-asserted control surface can serve to vary the color of a currently-rendered portion of that same scribed line of electronic ink.

These teachings are also highly flexible in practice and will accommodate a variety of multi-level force-sensitive user-asserted control surfaces, different number of multi-level force-sensitive user-asserted control surfaces, multi-level force-sensitive user-asserted control surfaces having various shapes and form factors, and so forth.

The present disclosure may be embodied in other specific forms without departing from its essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A stylus configured for use with a scribing surface, the stylus comprising:
   a barrel;
   a scribing nib disposed at one end of the barrel, where the scribing nib is a multi-level force-sensitive scribing nib configured to discretely detect multiple different levels of applied force;
   at least one multi-level force-sensitive user interface supported by the barrel, the multi-level force-sensitive user interface configured to discretely detect at least three different levels of applied force, wherein each of the at least three different levels of force are separate and distinct from any force being applied to the scribing surface and correspond to the multi-level force-sensitive user interface being depressed based on user contact therewith; and
   a control circuit configured to
      generate a first set of signals for each of the multiple different levels of applied force detected by the scribing nib, the first set of signals instructing a device to adjust at least a first characteristic of at least one object being displayed by the device,
      generate a second set of signals for each of the at least three different levels of applied force detected by the least one multi-level force-sensitive user interface, the second set of signals instructing the device to adjust at least a second characteristic of the at least one object being displayed by the device, where the second characteristic is different than the first characteristic,
      in response to generating the second set of signals, temporarily freeze transmitting signals in response to changes in applied force as applied to the multi-level force-sensitive scribing nib and as indicated by the first set of signal, and
      while transmitting signals in response to changes in applied force as applied to the multi-level force-sensitive scribing nib is temporarily frozen, responding to changing levels of force currently being applied to the multi-level force-sensitive user interface as indicated by the second set of signals.

2. The stylus of claim 1 wherein the control circuit is configured to respond differently to each of the at least three different levels of applied force as applied to the multi-level force-sensitive user interface.

3. The stylus of claim 1 further comprising:
   a wireless transmitter operably coupled to the control circuit and at least partially disposed within the barrel.

4. The stylus of claim 3 wherein the control circuit is configured to transmit, via the wireless transmitter, a first signal in response to detecting a first level of applied force via the multi-level force-sensitive user interface and transmitting a second signal that is different from the first signal in response to detecting a second level of applied force via the multi-level force-sensitive user interface, wherein the second level of applied force is different from the first level of applied force.

5. The stylus of claim 1 wherein the multi-level force-sensitive user interface comprises a button.

6. A method comprising:
by a stylus control circuit:
detecting at least two different levels of applied force as applied to a scribing nib in addition to any detection of an absence of applied force;
detecting at least three different levels of applied force as applied to at least one multi-level force-sensitive user interface, wherein each of the at least three different levels of applied force as applied to at least one multi-level force-sensitive user interface are separate and distinct from any force being applied to the scribing surface and correspond to the multi-level force-sensitive user interface being depressed based on user contact therewith;
generating a first set of signals for each of the at least two different levels of applied force as applied to the scribing nib, the first set of signals instructing a device to adjust at least a first characteristic of at least one object being displayed by the device;
generating a second set of signals for each of the at least three different levels of applied force as applied to the least one multi-level force-sensitive user interface, the second set of signals instructing the device to adjust at least a second characteristic of the at least one object being displayed by the device, where the second characteristic is different than the first characteristic;
in response to generating the second set of signals, temporarily freezing responding to changes in applied force as applied to the multi-level force-sensitive scribing nib and as indicated by the first set of signal, and
while response to changes in applied force as applied to the multi-level force-sensitive scribing nib is temporarily frozen, responding to changing levels of force currently being applied to the multi-level force-sensitive user interface as indicated by the second set of signals.

7. The method of claim 6 further comprising:
responding differently to each of at the least three different levels of applied force as applied to the multi-level force-sensitive user interface.

8. The method of claim 7 wherein responding differently comprises, at least in part, transmitting a first signal in response to detecting a first level of applied force via the multi-level force-sensitive user interface and transmitting a second signal that is different from the first signal in response to detecting a second level of applied force via the multi-level force-sensitive user interface, wherein the second level of applied force is different from the first level of applied force.

9. A method comprising:
by a stylus control circuit:
detecting at least two different levels of applied force as applied to a scribing nib in addition to any detection of an absence of applied force;
detecting at least three different levels of applied force as applied to at least one multi-level force-sensitive user interface, wherein each of the at least three different levels of applied force as applied to at least one multi-level force-sensitive user interface are separate and distinct from any force being applied to the scribing surface and correspond to the multi-level force-sensitive user interface being depressed based on user contact therewith;
generating a first set of signals for each of the at least two different levels of applied force as applied to the scribing nib, the first set of signals instructing a device to adjust at least a first characteristic of at least one object being displayed by the device;
generating a second set of signals for each of the at least three different levels of applied force as applied to the least one multi-level force-sensitive user interface, the second set of signals instructing the device to adjust at least a second characteristic of the at least one object being displayed by the device, where the second characteristic is different than the first characteristic;
in response to generating the first set of signals, responding to changing levels of force currently being applied to scribing nib as indicated by the first set of signals, wherein responding to the changing levels of force currently being applied to scribing nib adjusts the first characteristic of the at least one object being displayed; and
in response to generating the second set of signals and while the first characteristic of the at least one object is being adjusted, responding to changing levels of force currently being applied to the multi-level force-sensitive user interface as indicated by the second set of signals, wherein responding to the changing levels of force currently being applied to the multi-level force-sensitive user interface adjusts the second characteristic of the at least one object being displayed.

* * * * *